(12) United States Patent
Han et al.

(10) Patent No.: US 11,395,310 B2
(45) Date of Patent: Jul. 19, 2022

(54) PRIORITIZING USAGE OF LOGICAL CHANNELS CORRESPONDING TO LOGICAL IDENTIFIERS

(71) Applicant: LENOVO (BEIJING) LIMITED, Beijing (CN)

(72) Inventors: Jing Han, Beijing (CN); Lianhai Wu, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 175 days.

(21) Appl. No.: 16/964,013

(22) PCT Filed: Jan. 24, 2018

(86) PCT No.: PCT/CN2018/074020
§ 371 (c)(1),
(2) Date: Jul. 22, 2020

(87) PCT Pub. No.: WO2019/144320
PCT Pub. Date: Aug. 1, 2019

(65) Prior Publication Data
US 2021/0037541 A1 Feb. 4, 2021

(51) Int. Cl.
*H04L 12/28* (2006.01)
*H04W 72/10* (2009.01)
(Continued)

(52) U.S. Cl.
CPC ....... *H04W 72/10* (2013.01); *H04W 72/0453* (2013.01)

(58) Field of Classification Search
CPC ...... H04L 1/189; H04L 1/1819; H04W 72/10; H04W 76/11; H04W 76/15
(Continued)

(56) References Cited

U.S. PATENT DOCUMENTS

2011/0170495 A1 7/2011 Earnshaw et al.
2017/0295559 A1 10/2017 Agiwal et al.
(Continued)

FOREIGN PATENT DOCUMENTS

| CN | 102118858 A | 7/2011 |
| WO | 2017012467 A1 | 1/2017 |
| WO | 2017049728 A1 | 3/2017 |

OTHER PUBLICATIONS

PCT/CN2018/074020, "International Search Report and the Written Opinion of the International Search Authority" ISA/CN, State Intellectual Property Office of the P.R. China, dated Oct. 8, 2018, pp. 1-6.

*Primary Examiner* — John Pezzlo
(74) *Attorney, Agent, or Firm* — Kunzler Bean & Adamson

(57) ABSTRACT

Apparatuses, methods, and systems are disclosed for prioritizing usage of logical channels corresponding to logical identifiers. One method (800) includes reserving (802) a first logical channel identifier corresponding to a first logical channel configured to carry a copy of first data and reserving (804) a first association between the first and second logical channel identifiers. The second logical channel identifier corresponds to a second logical channel configured to carry a copy of the first data. The method (800) includes determining (806) a third logical channel identifier corresponding to a third logical channel configured to carry a copy of second data and determining (808) a second association between the third and fourth logical channel identifiers. The fourth logical channel identifier corresponds to a fourth logical channel configured to carry a copy of the second data. The method (800) includes prioritizing (810) usage of logical channels corresponding to reserved logical identifiers over logical channels corresponding to determined logical identifiers.

20 Claims, 7 Drawing Sheets

(51) Int. Cl.
*H04W 72/04* (2009.01)
*H04J 1/16* (2006.01)
(58) Field of Classification Search
USPC ..................................... 370/252, 395.3, 389
See application file for complete search history.

(56) References Cited

U.S. PATENT DOCUMENTS

2018/0368107 A1* 12/2018 Babaei .................. H04L 1/1822
2018/0368132 A1* 12/2018 Babaei .................. H04L 5/0053

* cited by examiner

PRIORITIZING USAGE OF LOGICAL CHANNELS CORRESPONDING TO LOGICAL IDENTIFIERS

FIELD

The subject matter disclosed herein relates generally to wireless communications and more particularly relates to prioritizing usage of logical channels corresponding to logical identifiers.

BACKGROUND

The following abbreviations are herewith defined, at least some of which are referred to within the following description: Third Generation Partnership Project ("3GPP"), Authentication Authorization and Accounting ("AAA"), Positive-Acknowledgment ("ACK"), Acknowledged Mode ("AM"), Access and Mobility Management Function ("AMF"), Access Server ("AS"), Authentication Server Function ("AUSF"), Cell Radio Network Temporary Identifier ("C-RNTI"), Dedicated Control Channel ("DCCH"), Downlink ("DL"), Domain Name System ("DNS"), Enhanced Mobile Broadband ("eMBB"), Evolved Node B ("eNB"), Enhanced Subscriber Identification Module ("eSIM"), Equipment Identity Register ("EIR"), Evolved Packet Core ("EPC"), European Telecommunications Standards Institute ("ETSI"), E-UTRAN Radio Access Bearer ("E-RAB"), Evolved-Universal Terrestrial Radio Access Network ("E-UTRAN"), Frequency Division Duplex ("FDD"), Frequency Division Multiple Access ("FDMA"), Fully Qualified Domain Name ("FQDN"), Global System For Mobile Communications Association ("GSMA"), Hybrid Automatic Repeat Request ("HARQ"), Home Policy Control Function ("H-PCF"), Home Public Land Mobile Network ("HPLMN"), Identity or Identifier or Identification ("ID"), International Mobile Equipment Identity ("IMEI"), International Mobile Subscriber Identity ("IMSI"), Internet-of-Things ("IoT"), Logical Channel Identifier ("LCID"), Long Term Evolution ("LTE"), Multiple Access ("MA"), Medium Access Control ("MAC"), Modulation Coding Scheme ("MCS"), Mobile Country Code ("MCC"), Mobile Network Code ("MNC"), Machine Type Communication ("MTC"), Master Information Block ("MIB"), Mobility Management ("MM"), Mobility Management Entity ("MME"), Non-Access Stratum ("NAS"), Narrowband ("NB"), Negative-Acknowledgment ("NACK") or ("NAK"), Next Generation Node B ("gNB"), Orthogonal Frequency Division Multiplexing ("OFDM"), Over-the-Air ("OTA"), Policy Control Function ("PCF"), Packet Data Convergence Protocol ("PDCP"), Protocol Data Unit ("PDU"), Public Land Mobile Network ("PLMN"), Pointer ("PTR"), Quality of Service ("QoS"), Random Access Channel ("RACH"), Radio Link Control ("RLC"), Radio Link Failure ("RLF"), Radio Network Layer ("RNL"), Radio Resource Control ("RRC"), Radio Resource Management ("RRM"), Radio Access Network ("RAN"), Reference Signal Received Power ("RSRP"), Reference Signal Received Quality ("RSRQ"), Receive ("RX"), Service Data Unit ("SDU"), Sequence Number ("SN"), Single Carrier Frequency Division Multiple Access ("SC-FDMA"), Subscriber Management Function ("SMF"), Subscriber Identity Module ("SIM"), System Information Block ("SIB"), Sidelink ("SL"), Shared Channel ("SCH"), Subscription Concealed Identifier ("SUCI"), Subscription Permanent Identifier ("SUPI"), Timing Advance Group ("TAG"), Tracking Area ("TA"), Transport Network Layer ("TNL"), Transmit ("TX"), Unified Data Management ("UDM"), User Data Repository ("UDR"), User Entity/Equipment (Mobile Terminal) ("UE"), Universal Integrated Circuit Card ("UICC"), Uplink ("UL"), Universal Mobile Telecommunications System ("UMTS"), User Plane Function ("UPF"), Universal Subscriber Identity Module ("USIM"), Interface Between UE and eNB ("UU"), Vehicle-to-Infrastructure ("V2I"), Vehicle-to-Network ("V2N"), Vehicle-to-Pedestrian ("V2P"), Vehicle-to-Everything ("V2X"), Vehicle-to-Vehicle ("V2V"), Visited Policy Control Function ("V-PCF"), Visited Public Land Mobile Network ("VPLMN"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, a remote unit may communicate directly with other remote units. In such networks, logical channels may be configured for transmitting original data and/or for transmitting duplicate data.

BRIEF SUMMARY

Methods for prioritizing usage of logical channels corresponding to logical identifiers are disclosed. Apparatuses and systems also perform the functions of the apparatus. In one embodiment, the method includes reserving a first logical channel identifier corresponding to a first logical channel configured to carry a first copy of first data. In various embodiments, the method includes reserving a first association between the first logical channel identifier and a second logical channel identifier. In such embodiments, the second logical channel identifier corresponds to a second logical channel configured to carry a second copy of the first data. In certain embodiments, the method includes determining a third logical channel identifier corresponding to a third logical channel configured to carry a first copy of second data. In some embodiments, the method includes determining a second association between the third logical channel identifier and a fourth logical channel identifier. In such embodiments, the fourth logical channel identifier corresponds to a fourth logical channel configured to carry a second copy of the second data. In various embodiments, the method includes prioritizing usage of logical channels corresponding to reserved logical channel identifiers over logical channels corresponding to determined logical channel identifiers.

In one embodiment, reserving the first logical channel identifier includes storing the first logical channel identifier and the first association. In a further embodiment, determining the third logical channel identifier and the second association includes receiving signaling having information indicating the third logical channel identifier and the second association. In certain embodiments, determining the third logical channel identifier and the second association includes receiving signaling having an index indicating the third logical channel identifier and the second association. In various embodiments, determining the third logical channel identifier and the second association includes receiving signaling indicating: either the third logical channel identifier or the fourth logical channel identifier; and an offset corresponding to a logical channel index gap between the third logical channel and the fourth logical channel. In some embodiments, determining the third logical channel identifier and the second association includes receiving signaling indicating the third logical channel identifier, and the second association is determined based on the third logical channel identifier and the offset. In certain embodiments, determining the third logical channel identifier and the second association includes receiving signaling indicating the fourth logical channel identifier, and the third logical channel identifier and the second association is determined based on the fourth logical channel identifier and the offset.

In various embodiments, prioritizing usage of the logical channels corresponding to the reserved logical channel identifiers over the logical channels corresponding to the determined logical channel identifiers includes using the logical channels corresponding to the reserved logical channel identifiers for services having a reliability target greater than a predetermined threshold, for services having a reliability target greater than that of other services, or a combination thereof. In some embodiments, prioritizing usage of the logical channels corresponding to the reserved logical channel identifiers over the logical channels corresponding to the determined logical channel identifiers includes prioritizing usage of logical channels for the logical channels not being used by services. In certain embodiments, prioritizing usage of the logical channels corresponding to the reserved logical channel identifiers over the logical channels corresponding to the determined logical channel identifiers includes using the logical channels corresponding to the determined logical channel identifiers in response to the logical channels corresponding to the reserved logical channel identifiers being used by services. In various embodiments, prioritizing usage of the logical channels corresponding to the reserved logical channel identifiers over the logical channels corresponding to the determined logical channel identifiers includes transmitting a request for additional logical channels in response to the logical channels corresponding to the reserved logical channel identifiers and the logical channels corresponding to the determined logical channel identifiers being used by services. In some embodiments, prioritizing usage of the logical channels corresponding to the reserved logical channel identifiers over the logical channels corresponding to the determined logical channel identifiers includes using logical channels not corresponding to the reserved logical channel identifiers and logical channels not corresponding to the determined logical channel identifiers for services having a reliability target less than a predetermined threshold, for services having a reliability target less than that of other services, or a combination thereof.

An apparatus for prioritizing usage of logical channels corresponding to logical identifiers, in one embodiment, includes a processor that: reserves a first logical channel identifier corresponding to a first logical channel configured to carry a first copy of first data; reserves a first association between the first logical channel identifier and a second logical channel identifier, wherein the second logical channel identifier corresponds to a second logical channel configured to carry a second copy of the first data; determines a third logical channel identifier corresponding to a third logical channel configured to carry a first copy of second data; determines a second association between the third logical channel identifier and a fourth logical channel identifier, wherein the fourth logical channel identifier corresponds to a fourth logical channel configured to carry a second copy of the second data; and prioritizes usage of logical channels corresponding to reserved logical channel identifiers over logical channels corresponding to determined logical channel identifiers.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
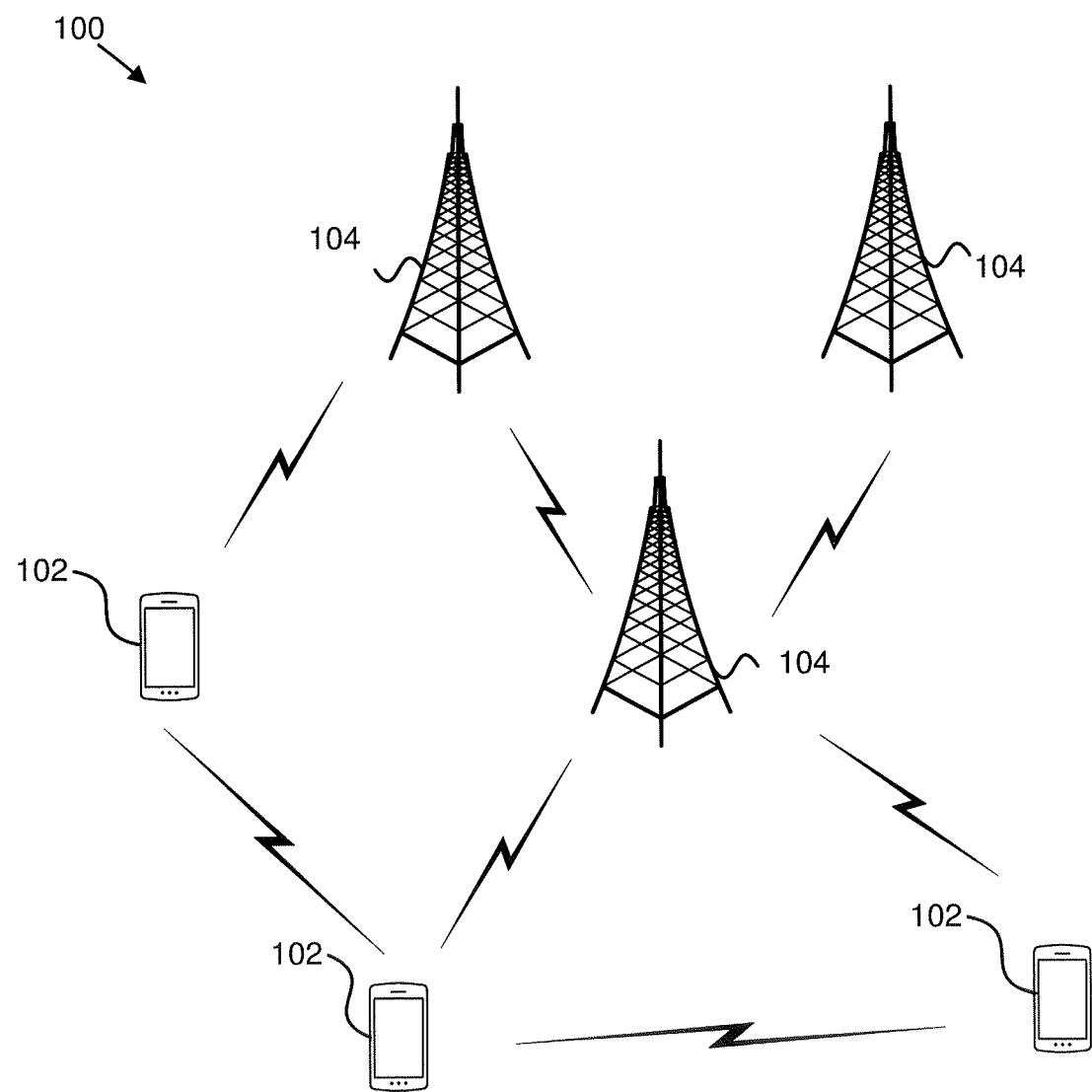
FIG. 1 is a schematic block diagram illustrating one embodiment of a wireless communication system for prioritizing usage of logical channels corresponding to logical identifiers.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/acts specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for prioritizing usage of logical channels corresponding to logical identifiers. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In various embodiments, the remote units 102 may communicate directly with one or more other remote units 102.

The network units 104 may be distributed over a geographic region. In certain embodiments, a network unit 104 may also be referred to as an access point, an access terminal, a base, a base unit, a base station, a Node-B, an eNB, a gNB, a Home Node-B, a relay node, a device, a network device, an infrastructure device, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art. In some embodiments, a network unit 104 may include one or more of the following network components an eNB, a gNB, an AMF, a DB, an MME, a PCF, a UDR, a UPF, a serving gateway, and/or a UDM.

In one implementation, the wireless communication system 100 is compliant with the LTE of the 3GPP protocol, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In certain embodiments, a remote unit 102 may reserve a first logical channel identifier corresponding to a first logical channel configured to carry a first copy of first data. In various embodiments, the remote unit 102 may reserve a first association between the first logical channel identifier and a second logical channel identifier. In such embodiments, the second logical channel identifier corresponds to a second logical channel configured to carry a second copy of the first data. In certain embodiments, the remote unit 102 may determine a third logical channel identifier corresponding to a third logical channel configured to carry a first copy of second data. In some embodiments, the remote unit 102 may determine a second association between the third logical channel identifier and a fourth logical channel identifier. In such embodiments, the fourth logical channel identifier corresponds to a fourth logical channel configured to carry a second copy of the second data. In various embodiments, the remote unit 102 may prioritize usage of logical channels corresponding to reserved logical channel identifiers over logical channels corresponding to determined logical channel identifiers. Accordingly, a remote unit 102 may be used for prioritizing usage of logical channels corresponding to logical identifiers.

In various embodiments, a network unit 104 may transmit one or more identifiers corresponding to one or more logical channels. In certain embodiments, the network unit 104 may transmit information corresponding to prioritizing usage of logic channels, such as to prioritize logical channels corresponding to reserved logical channel identifiers over logical channels corresponding to determined logical channel identifiers. Accordingly, a network unit 104 may be used for prioritizing usage of logical channels corresponding to logical identifiers.

Figure 2:
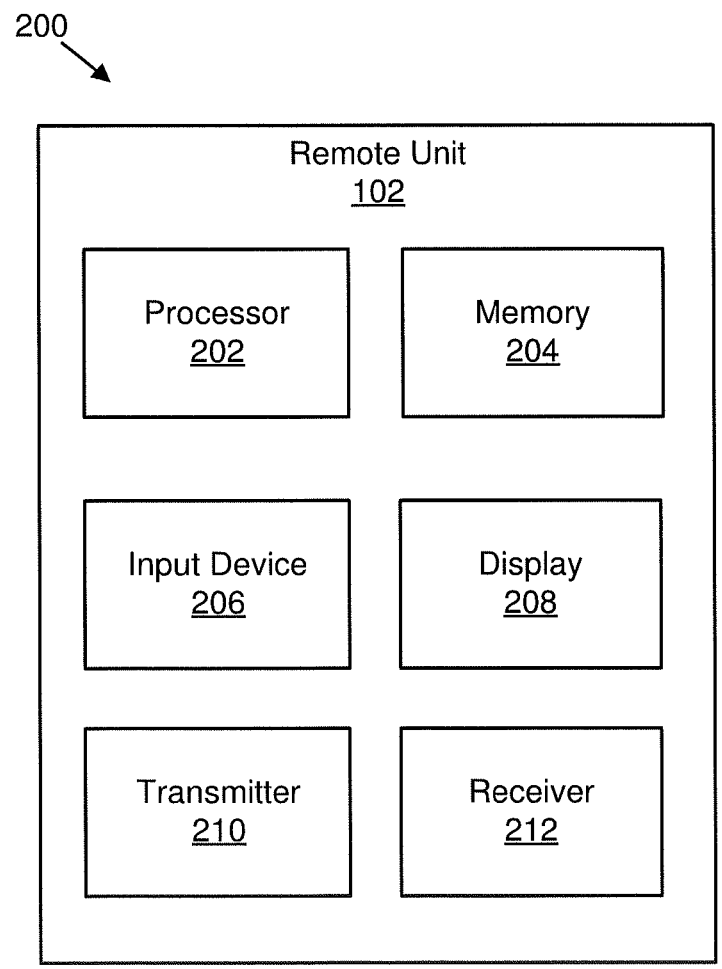
FIG. 2 is a schematic block diagram illustrating one embodiment of an apparatus that may be used for prioritizing usage of logical channels corresponding to logical identifiers.

FIG. 2 depicts one embodiment of an apparatus 200 that may be used for prioritizing usage of logical channels corresponding to logical identifiers. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In certain embodiments, the processor 202 may: reserve a first logical channel identifier corresponding to a first logical channel configured to carry a first copy of first data; reserve a first association between the first logical channel identifier and a second logical channel identifier, wherein the second logical channel identifier corresponds to a second logical channel configured to carry a second copy of the first data; determine a third logical channel identifier corresponding to a third logical channel configured to carry a first copy of second data; determine a second association between the third logical channel identifier and a fourth logical channel identifier, wherein the fourth logical channel identifier corresponds to a fourth logical channel configured to carry a second copy of the second data; and prioritize usage of logical channels corresponding to reserved logical channel identifiers over logical channels corresponding to determined logical channel identifiers. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to logical channel identifiers and associations between logical channel identifiers. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
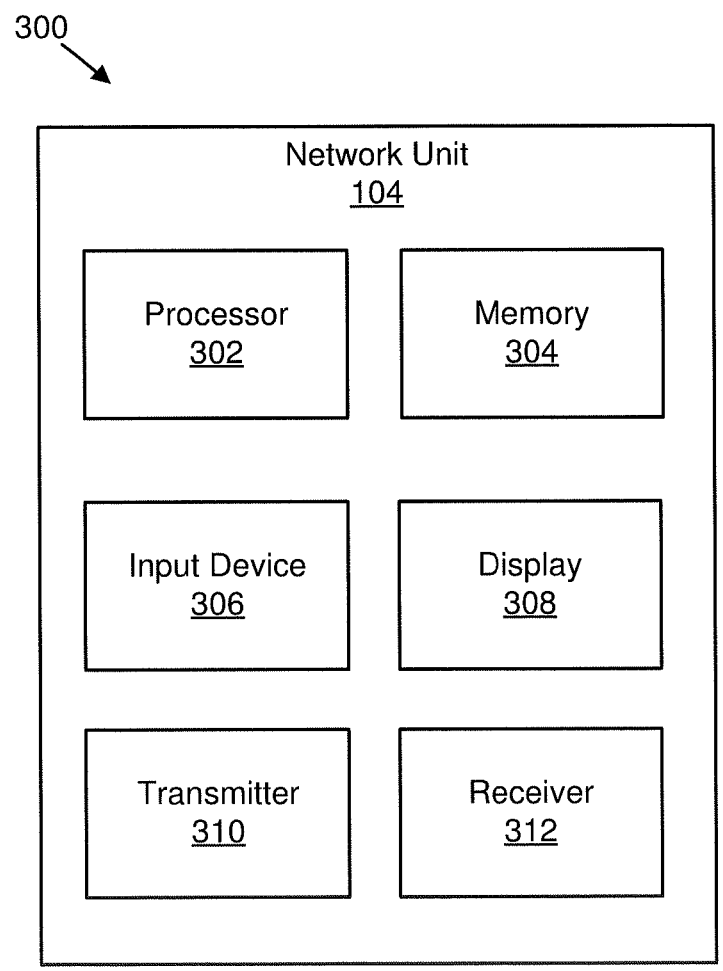
FIG. 3 is a schematic block diagram illustrating one embodiment of an apparatus that may be used for prioritizing usage of logical channels corresponding to logical identifiers.

FIG. 3 depicts one embodiment of an apparatus 300 that may be used for prioritizing usage of logical channels corresponding to logical identifiers. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310 is used to transmit one or more identifiers corresponding to one or more logical channels. In certain embodiments, the transmitter 310 may transmit information corresponding to prioritizing usage of logic channels, such as to prioritize logical channels corresponding to reserved logical channel identifiers over logical channels corresponding to determined logical channel identifiers. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In one embodiment, V2X services may include, among others, vehicle platooning, extended sensors, advanced driving, and/or remote driving. In some embodiments, V2V communication may involve carrier aggregation of up to 8 carriers. In certain embodiments, carrier aggregation may be based on one or more of the following: parallel transmission of MAC PDUs for different packets (as used herein parallel transmission may mean transmission at the same or different transmission time, but on different carriers, and the MAC PDU payloads may be different); parallel transmission of replicated copies of the same packet (described in greater detail herein); and/or capacity improvements from a receiver perspective.

In one embodiment, a number of reserved LCIDs may be kept small because the number of LCIDs is limited. As used herein, a reserved LCID may be an LCID that is dedicated (or only used) for a particular action. In some embodiments, an LCID may have 5 bits corresponding to 32 possible LCIDs.

Figure 4:
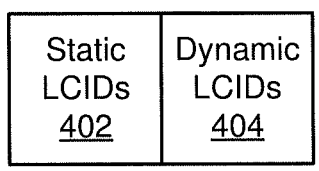
FIG. 4 illustrates one embodiment of LCIDs.

FIG. 4 illustrates one embodiment of LCIDs 400. The LCIDs 400 include static LCIDs 402 and dynamic LCIDs 404. Each of the static LCIDs 402 and the dynamic LCIDs 404 (e.g., semi-static LCIDs) may represent IDs that correspond to logical channels. In certain embodiments, the static LCIDs 402 may be fixed and/or hard-coded into a remote unit 102. In various embodiments, the static LCIDs 402 may be defined by a specification for a remote unit 102 (e.g., standardized for all remote units 102 regardless of an operator and/or a carrier). In some embodiments, the static LCIDs 402 may be considered reserved LCIDs by a remote unit 102. In certain embodiments, the static LCIDs 402 include a specific number of reserved LCIDs and specific LCIDs that are fixed. For example, in one embodiment, there may be 7 reserved LCIDs and the LCIDs for those 7 reserved LCIDs may be "00000," "00001," "00010," "00011," "00100," "00101," and "00110."

In some embodiments, the dynamic LCIDs 404 may be preconfigured for a remote unit 102 (e.g., configured by an operator and/or a carrier corresponding to the remote unit 102 and therefore not necessarily the same among different operators and/or carriers, not standardized for all remote units 102, semi-static). In certain embodiments, the dynamic LCIDs 404 may be configured for a remote unit 102 (e.g., the dynamic LCIDs 404 may be transmitted to the remote unit 102 using signaling such as RRC signaling). In various embodiments, the dynamic LCIDs 404 may be considered LCIDs determined by a remote unit 102 (e.g., determined by being preconfigured and/or configured). In some embodiments, the static LCIDs 402 and the dynamic LCIDs 404 may be insufficient for a remote unit 102. In such embodiments, the remote unit 102 may send a request to a network unit 104 to acquire additional LCIDs for transmissions. As may be appreciated, by having the static LCIDs 402 and the dynamic LCIDs 404, a number of reserved LCIDs (e.g., static LCIDs 402) may be reduced.

Figure 5:
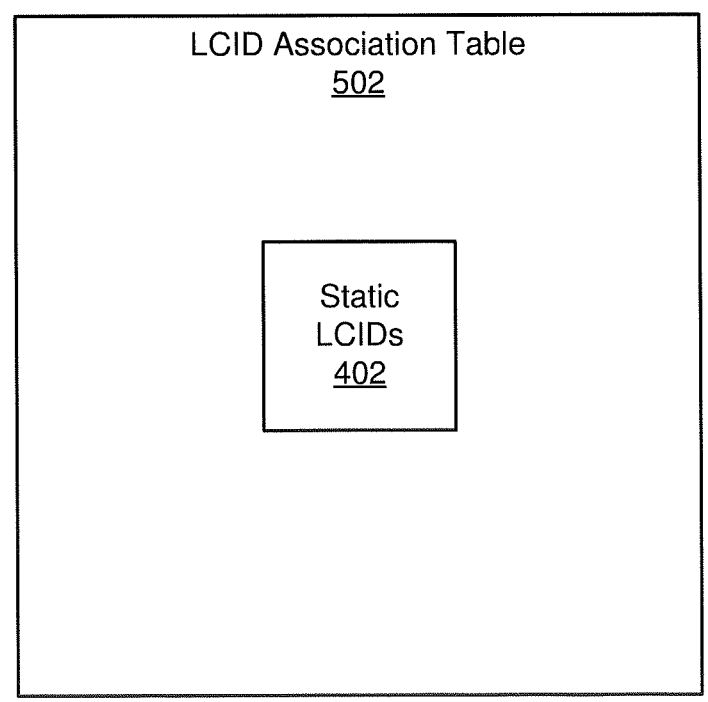
FIG. 5 illustrates one embodiment of LCID association.

FIG. 5 illustrates one embodiment of LCID association 500. In various embodiments, the LCID association 500 may be stored in any suitable type of data structure, such as an array, a list, a table, a tree, a database, an object, a string, and so forth. In one embodiment, the LCID association 500 between static LCIDs 402 corresponding to logical channels used to transmit original data (e.g., a first copy of data) and static LCIDs 402 corresponding to logical channels used to transmit duplicate data (e.g., a second copy of data) may be stored in an LCID association table 502 corresponding to the static LCIDs 402. In some embodiments, the LCID association 500 may be static (e.g., reserved, fixed, hard-coded, standardized for all remote units 102 regardless of an operator and/or a carrier). For example, in one embodiment, static LCIDs 402 corresponding to logical channels used to transmit original data may be in a range including LCID aaaaa through LCID bbbbb (e.g., LCID "00000" through LCID "00110" if there are 7 LCIDs corresponding to logical channels used to transmit original data). As another example, in one embodiment, static LCIDs 402 corresponding to logical channels used to transmit duplicate data may be in a range including LCID xxxxx through LCID yyyyy (e.g., LCID "10000" through LCID "10110" if there are 7 LCIDs corresponding to logical channels used to transmit duplicate data). In such examples, the LCID association 500 may indicate a mapping between LCIDs aaaaa through bbbbb and LCIDs xxxxx through yyyyy. One embodiment of the LCID association table 502 showing the mapping between LCIDs aaaaa through bbbbb and LCIDs xxxxx through yyyyy is found in Table 1. Another embodiment of the LCID association table 502 showing the mapping between specific LCIDs is found in Table 2. The LCID association 500 may enable a remote unit 102 to know an association between logical channels used to transmit original data and logical channels used to transmit duplicate data.

TABLE 1

| Index (static LCIDs 402 corresponding to logical channels used to transmit duplicate data) | Association (static LCIDs 402 corresponding to logical channels used to transmit original data) |
| --- | --- |
| xxxxx | aaaaa |
| . | . |
| . | . |
| . | . |
| yyyyy | bbbbb |

TABLE 2

| Index (static LCIDs 402 corresponding to logical channels used to transmit duplicate data) | Association (static LCIDs 402 corresponding to logical channels used to transmit original data) |
| --- | --- |
| 10000 | 00000 |
| 10001 | 00001 |
| 10010 | 00010 |
| 10011 | 00011 |
| 10100 | 00100 |
| 10101 | 00101 |
| 10110 | 00110 |

Figure 6:
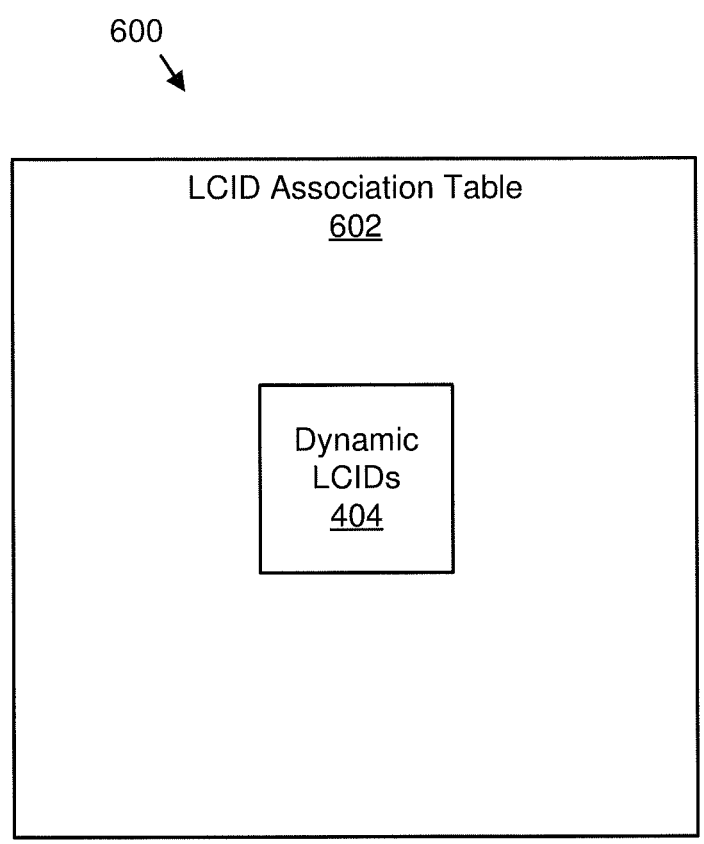
FIG. 6 illustrates another embodiment of LCID association.

FIG. 6 illustrates another embodiment of LCID association 600. In various embodiments, the LCID association 600 may be stored in any suitable type of data structure, such as an array, a list, a table, a tree, a database, an object, a string, and so forth. In one embodiment, the LCID association 600 between dynamic LCIDs 404 corresponding to logical channels used to transmit original data (e.g., a first copy of data) and dynamic LCIDs 404 corresponding to logical channels used to transmit duplicate data (e.g., a second copy of data) may be stored in an LCID association table 602 corresponding to the dynamic LCIDs 404. In some embodiments, the LCID association 600 may be dynamic (e.g., determined, configured by an operator and/or a carrier corresponding to the remote unit 102 and therefore not necessarily the same among different operators and/or carriers, not standardized for all remote units 102, transmitted to the remote unit 102 using signaling such as RRC signaling, determined by a remote unit 102). In various embodiments, the LCID association 600 may be static (e.g., stored by a remote unit 102), but the LCIDs used from the LCID association 600 may be dynamic. In one example, dynamic LCIDs 404 corresponding to logical channels used to transmit original data may be in a range including LCID aaaaa through LCID bbbbb (e.g., LCID "01000" through LCID "01011" if there are 4 LCIDs corresponding to logical channels used to transmit original data). As another example, in one embodiment, dynamic LCIDs 404 corresponding to logical channels used to transmit duplicate data may be in a range including LCID xxxxx through LCID yyyyy (e.g., LCID "11000" through LCID "11011" if there are 4 LCIDs corresponding to logical channels used to transmit duplicate data). In such examples, the LCID association 600 may indicate a mapping between LCIDs aaaaa through bbbbb and LCIDs xxxxx through yyyyy. One embodiment of the LCID association table 602 showing the mapping between LCIDs aaaaa through bbbbb and LCIDs xxxxx through yyyyy is found in Table 3. Another embodiment of the LCID association table 602 showing the mapping between specific LCIDs is found in Table 4. The LCID association 600 may enable a remote unit 102 to know an association between logical channels used to transmit original data and logical channels used to transmit duplicate data.

In some embodiments, information used to form the LCID association 600 may be preconfigured and/or configured by signaling. In one embodiment, a mapping (e.g., association) between dynamic LCIDs 404 corresponding to logical channels used to transmit duplicate data (e.g., xxxxx) and dynamic LCIDs 404 corresponding to logical channels used to transmit original data (e.g., aaaaa) may be signaled directly to a remote unit 102. For example, the signaling may indicate a mapping between xxxxx and aaaaa.

In certain embodiments, a mapping (e.g., association) between dynamic LCIDs 404 corresponding to logical channels used to transmit duplicate data (e.g., xxxxx) and dynamic LCIDs 404 corresponding to logical channels used to transmit original data (e.g., aaaaa) may be signaled to a remote unit 102 using an index, such as the example indexes found in Tables 3 and 4. In such embodiments, the signaling may include the index, and the remote unit 102 may already have the table stored internally. Thus, by receiving the index via the signaling, the remote unit 102 may know the association. In some embodiments, there may be different associations using the same LCIDs as shown in Table 5 so that the signaling may more dynamically indicate associations. For example, an index of 4 may indicate an association between LCIDs "11011" and "01011" while an index of 5 may indicate an association between LCIDs "11010" and "01011." In such an example, LCID "01011" is in both indexes, but only one of these indexes may be signaled to the remote unit 102. By transmitting an index to indicate an association, data transmitted to the remote unit 102 corresponding to an association may be reduced compared to transmitting an entire association.

TABLE 3

| Index | Dynamic LCIDs 404 Corresponding To Logical Channels Used To Transmit Duplicate Data | Associated Dynamic LCIDs 404 Corresponding To Logical Channels Used To Transmit Original Data |
| --- | --- | --- |
| 1 | xxxxx | aaaaa |
| 2 | yyyyy | bbbbb |

TABLE 4

| Index | Dynamic LCIDs 404 Corresponding To Logical Channels Used To Transmit Duplicate Data | Associated Dynamic LCIDs 404 Corresponding To Logical Channels Used To Transmit Original Data |
| --- | --- | --- |
| 1 | 11000 | 01000 |
| 2 | 11001 | 01001 |
| 3 | 11010 | 01010 |
| 4 | 11011 | 01011 |

TABLE 5

| Index | Dynamic LCIDs 404 Corresponding To Logical Channels Used To Transmit Duplicate Data | Associated Dynamic LCIDs 404 Corresponding To Logical Channels Used To Transmit Original Data |
| --- | --- | --- |
| 1 | 11000 | 01000 |
| 2 | 11001 | 01001 |
| 3 | 11010 | 01010 |
| 4 | 11011 | 01011 |
| 5 | 11010 | 01011 |
| 6 | 11001 | 01010 |

Figure 7:
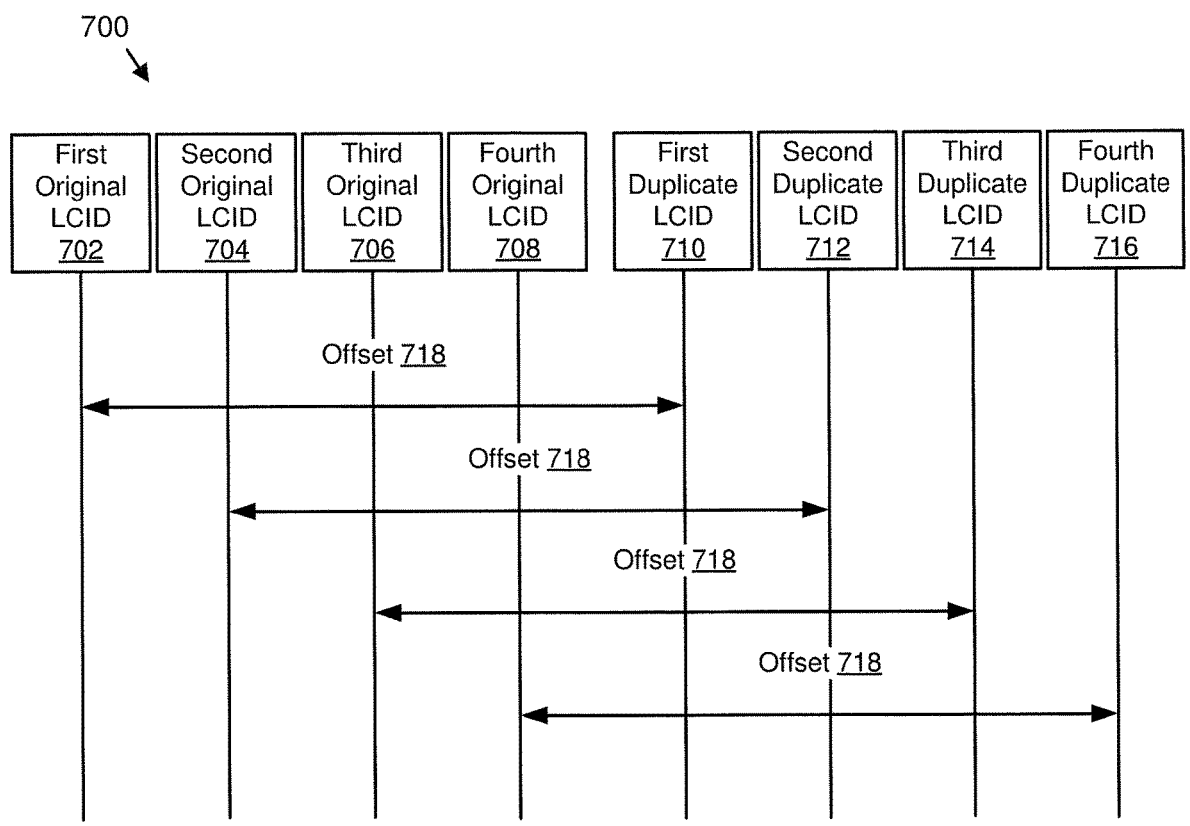
FIG. 7 illustrates a further embodiment of LCID association.

FIG. 7 illustrates a further embodiment of LCID association 700. The LCID association 700 includes a first original LCID 702 corresponding to a first logical channel used to transmit a first copy of first data, a second original LCID 704 corresponding to a second logical channel used to transmit a first copy of second data, a third original LCID 706 corresponding to a third logical channel used to transmit a first copy of third data, a fourth original LCID 708 corresponding to a fourth logical channel used to transmit a first copy of fourth data, a first duplicate LCID 710 corresponding to a fifth logical channel used to transmit a second copy of the first data, a second duplicate LCID 712 corresponding to a sixth logical channel used to transmit a second copy of the second data, a third duplicate LCID 714 corresponding to a seventh logical channel used to transmit a second copy of the third data, and a fourth duplicate LCID 716 corresponding to an eighth logical channel used to transmit a second copy of the fourth data. An offset 718 corresponds to a logical channel index gap (e.g., LCID gap, difference between LCIDs, etc.) between an original LCID and a duplicate LCID, as illustrated. Although the original LCIDs are shown as being before the duplicate LCIDs, in other embodiments, the original LCIDs may be after the duplicate LCIDs. In certain embodiments, the offset 718 may be signaled to a remote unit 102 to indicate the LCID association 700 between original LCIDs and duplicate LCIDs. For example, based on the embodiment of FIG. 7, if the LCID corresponding to a logical channel used to transmit duplicate data (e.g., LCIDs 710-716) is xxxxx and the offset 718 is h, then the associated LCID corresponding to a logical channel used to transmit original data (e.g., LCIDs 702-708) is xxxxx-h. As another example, also based on the embodiment of FIG. 7, if the LCID corresponding to a logical channel used to transmit original data (e.g., LCIDs 702-708) is aaaaa and the offset 718 is h, then the associated LCID corresponding to a logical channel used to transmit duplicate data (e.g., LCIDs 710-716) is aaaaa+h. By transmitting the offset 718 and one LCID to indicate an association, data transmitted to the remote unit 102 corresponding to an association may be reduced compared to transmitting an entire association.

A remote unit 102 may prioritize LCID using any suitable rules. In one embodiment, if a remote unit 102 has both the static LCIDs 402 and the dynamic LCIDs 404, and has multiple services and/or packets being used simultaneously, for services and/or packets with higher reliability requirements (e.g., reliability target) (or reliability requirements higher than the preconfigured and/or configured reliability threshold), the remote unit 102 may prioritize the use of logical channels corresponding to the static LCIDs 402 for transmission over the use of logical channels corresponding to the dynamic LCIDs 404. In certain embodiments, if a remote unit 102 receives a new service and/or packet with a higher or lower reliability requirement, the new service and/or packet cannot occupy a logical channel that has already setup for specific service transmission.

In various embodiments, if a remote unit 102 has both the static LCIDs 402 and the dynamic LCIDs 404, and all of the static LCIDs 402 are being used, the remote unit may use the dynamic LCIDs 404. In some embodiments, if a remote unit 102 has both the static LCIDs 402 and the dynamic LCIDs 404, and all of the static LCIDs 402 and all of the dynamic LCIDs 404 are being used, the remote unit 102 may setup an RRC connection with a network unit 104 if possible and send a request to the network unit 104 for additional LCIDs. In various embodiments, for services and/or packets that have a low reliability requirement (or reliability requirement lower than a preconfigured and/or configured reliability threshold, the remote unit 102 may prioritize the use of logical channels that are not associated, preconfigured, and/ or configured with a duplicate logical channel. By having a prioritization of LCIDs at the remote unit 102, the remote unit 102 may make the best use of the LCIDs available.

Figure 8:
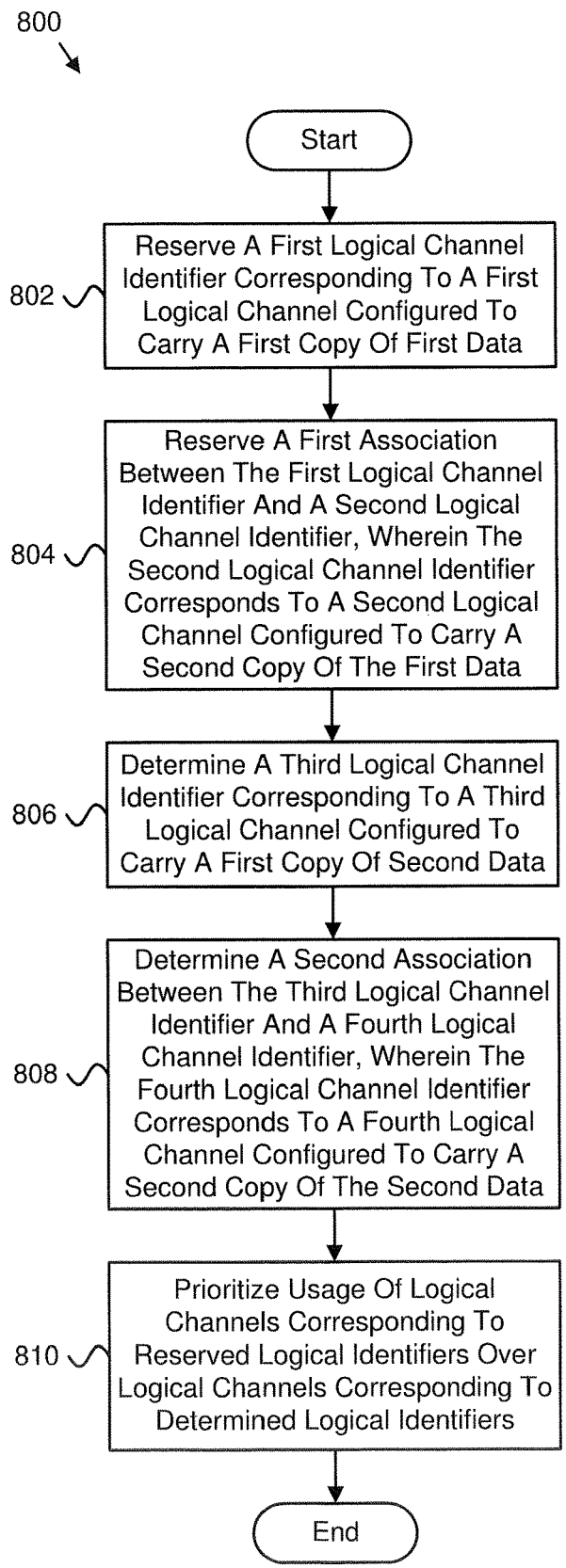
FIG. 8 is a schematic flow chart diagram illustrating one embodiment of a method for prioritizing usage of logical channels corresponding to logical identifiers.

FIG. 8 is a schematic flow chart diagram illustrating one embodiment of a method 800 for prioritizing usage of logical channels corresponding to logical identifiers. In some embodiments, the method 800 is performed by an apparatus, such as the remote unit 102. In certain embodiments, the method 800 may be performed by a processor executing program code, for example, a microcontroller, a microprocessor, a CPU, a GPU, an auxiliary processing unit, a FPGA, or the like.

The method 800 may include reserving 802 a first logical channel identifier corresponding to a first logical channel configured to carry a first copy of first data. In various embodiments, the method 800 includes reserving 804 a first association between the first logical channel identifier and a second logical channel identifier. In such embodiments, the second logical channel identifier corresponds to a second logical channel configured to carry a second copy of the first data. In certain embodiments, the method 800 includes determining 806 a third logical channel identifier corresponding to a third logical channel configured to carry a first copy of second data. In some embodiments, the method 800 includes determining 808 a second association between the third logical channel identifier and a fourth logical channel identifier. In such embodiments, the fourth logical channel identifier corresponds to a fourth logical channel configured to carry a second copy of the second data. In various embodiments, the method 800 includes prioritizing 810 usage of logical channels corresponding to reserved logical channel identifiers over logical channels corresponding to determined logical channel identifiers.

In one embodiment, reserving 802 the first logical channel identifier includes storing the first logical channel identifier and the first association. In a further embodiment, determining 806 the third logical channel identifier and the second association includes receiving signaling having information indicating the third logical channel identifier and the second association. In certain embodiments, determining 806 the third logical channel identifier and the second association includes receiving signaling having an index indicating the third logical channel identifier and the second association. In various embodiments, determining 806 the third logical channel identifier and the second association includes receiving signaling indicating: either the third logical channel identifier or the fourth logical channel identifier; and an offset corresponding to a logical channel index gap between the third logical channel and the fourth logical channel. In some embodiments, determining 806 the third logical channel identifier and the second association includes receiving signaling indicating the third logical channel identifier, and the second association is determined based on the third logical channel identifier and the offset. In certain embodiments, determining 806 the third logical channel identifier and the second association includes receiving signaling indicating the fourth logical channel identifier, and the third logical channel identifier and the second association is determined based on the fourth logical channel identifier and the offset.

In various embodiments, prioritizing 810 usage of the logical channels corresponding to the reserved logical channel identifiers over the logical channels corresponding to the determined logical channel identifiers includes using the logical channels corresponding to the reserved logical channel identifiers for services having a reliability target greater than a predetermined threshold, for services having a reliability target greater than that of other services, or a combination thereof. In some embodiments, prioritizing 810 usage of the logical channels corresponding to the reserved logical channel identifiers over the logical channels corresponding to the determined logical channel identifiers includes prioritizing usage of logical channels for the logical channels not being used by services. In certain embodiments, prioritizing 810 usage of the logical channels corresponding to the reserved logical channel identifiers over the logical channels corresponding to the determined logical channel identifiers includes using the logical channels corresponding to the determined logical channel identifiers in response to the logical channels corresponding to the reserved logical channel identifiers being used by services. In various embodiments, prioritizing 810 usage of the logical channels corresponding to the reserved logical channel identifiers over the logical channels corresponding to the determined logical channel identifiers includes transmitting a request for additional logical channels in response to the logical channels corresponding to the reserved logical channel identifiers and the logical channels corresponding to the determined logical channel identifiers being used by services. In some embodiments, prioritizing 810 usage of the logical channels corresponding to the reserved logical channel identifiers over the logical channels corresponding to the determined logical channel identifiers includes using logical channels not corresponding to the reserved logical channel identifiers and logical channels not corresponding to the determined logical channel identifiers for services having a reliability target less than a predetermined threshold, for services having a reliability target less than that of other services, or a combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:
1. A method comprising:
reserving a first logical channel identifier corresponding to a first logical channel configured to carry a first copy of first data;
reserving a first association between the first logical channel identifier and a second logical channel identifier, wherein the second logical channel identifier corresponds to a second logical channel configured to carry a second copy of the first data;

determining a third logical channel identifier corresponding to a third logical channel configured to carry a first copy of second data;

determining a second association between the third logical channel identifier and a fourth logical channel identifier, wherein the fourth logical channel identifier corresponds to a fourth logical channel configured to carry a second copy of the second data; and prioritizing usage of logical channels corresponding to reserved logical channel identifiers over logical channels corresponding to determined logical channel identifiers.

2. The method of claim 1, wherein reserving the first logical channel identifier comprises storing the first logical channel identifier and the first association.

3. The method of claim 1, wherein determining the third logical channel identifier and the second association comprises receiving signaling comprising information indicating the third logical channel identifier and the second association.

4. The method of claim 1, wherein determining the third logical channel identifier and the second association comprises receiving signaling comprising an index indicating the third logical channel identifier and the second association.

5. The method of claim 1, wherein determining the third logical channel identifier and the second association comprises receiving signaling indicating:

either the third logical channel identifier or the fourth logical channel identifier; and an offset corresponding to a logical channel index gap between the third logical channel and the fourth logical channel.

6. The method of claim 5, wherein determining the third logical channel identifier and the second association comprises receiving signaling indicating the third logical channel identifier, and the second association is determined based on the third logical channel identifier and the offset.

7. The method of claim 5, wherein determining the third logical channel identifier and the second association comprises receiving signaling indicating the fourth logical channel identifier, and the third logical channel identifier and the second association is determined based on the fourth logical channel identifier and the offset.

8. The method of claim 1, wherein prioritizing usage of the logical channels corresponding to the reserved logical channel identifiers over the logical channels corresponding to the determined logical channel identifiers comprises using the logical channels corresponding to the reserved logical channel identifiers for services having a reliability target greater than a predetermined threshold, for services having a reliability target greater than that of other services, or a combination thereof.

9. The method of claim 1, wherein prioritizing usage of the logical channels corresponding to the reserved logical channel identifiers over the logical channels corresponding to the determined logical channel identifiers comprises prioritizing usage of logical channels for the logical channels not being used by services.

10. The method of claim 1, wherein prioritizing usage of the logical channels corresponding to the reserved logical channel identifiers over the logical channels corresponding to the determined logical channel identifiers comprises using the logical channels corresponding to the determined logical channel identifiers in response to the logical channels corresponding to the reserved logical channel identifiers being used by services.

11. The method of claim 1, wherein prioritizing usage of the logical channels corresponding to the reserved logical channel identifiers over the logical channels corresponding to the determined logical channel identifiers comprises transmitting a request for additional logical channels in response to the logical channels corresponding to the reserved logical channel identifiers and the logical channels corresponding to the determined logical channel identifiers being used by services.

12. The method of claim 1, wherein prioritizing usage of the logical channels corresponding to the reserved logical channel identifiers over the logical channels corresponding to the determined logical channel identifiers comprises using logical channels not corresponding to the reserved logical channel identifiers and logical channels not corresponding to the determined logical channel identifiers for services having a reliability target less than a predetermined threshold, for services having a reliability target less than that of other services, or a combination thereof.

13. An apparatus comprising:
a processor that:
reserves a first logical channel identifier corresponding to a first logical channel configured to carry a first copy of first data;

reserves a first association between the first logical channel identifier and a second logical channel identifier, wherein the second logical channel identifier corresponds to a second logical channel configured to carry a second copy of the first data;

determines a third logical channel identifier corresponding to a third logical channel configured to carry a first copy of second data;

determines a second association between the third logical channel identifier and a fourth logical channel identifier, wherein the fourth logical channel identifier corresponds to a fourth logical channel configured to carry a second copy of the second data; and prioritizes usage of logical channels corresponding to reserved logical channel identifiers over logical channels corresponding to determined logical channel identifiers.

14. The apparatus of claim 13, further comprising a memory that stores the first logical channel identifier and the first association.

15. The apparatus of claim 13, further comprising a receiver that receives signaling comprising information indicating the third logical channel identifier and the second association.

16. The apparatus of claim 13, further comprising a receiver that receives signaling comprising an index indicating the third logical channel identifier and the second association.

17. The apparatus of claim 13, further comprising a receiver that receives signaling indicating:

either the third logical channel identifier or the fourth logical channel identifier; and an offset corresponding to a logical channel index gap between the third logical channel and the fourth logical channel.

18. The apparatus of claim 17, wherein the receiver receives signaling indicating the third logical channel identifier, and the second association is determined by the processor based on the third logical channel identifier and the offset.

19. The apparatus of claim 17, wherein the receiver receives signaling indicating the fourth logical channel identifier, and the third logical channel identifier and the second association is determined by the processor based on the fourth logical channel identifier and the offset.

20. The apparatus of claim 13, wherein the processor prioritizing usage of the logical channels corresponding to the reserved logical channel identifiers over the logical channels corresponding to the determined logical channel identifiers comprises the processor using the logical channels corresponding to the reserved logical channel identifiers for services having a reliability target greater than a predetermined threshold, for services having a reliability target greater than that of other services, or a combination thereof.

* * * * *